Sept. 11, 1956  J. K. GAYLORD ET AL  2,762,476
AUTOMOTIVE ANTI-CREEP DEVICE WITH PENDULUM SWITCH MEANS
Filed June 14, 1952  2 Sheets-Sheet 1
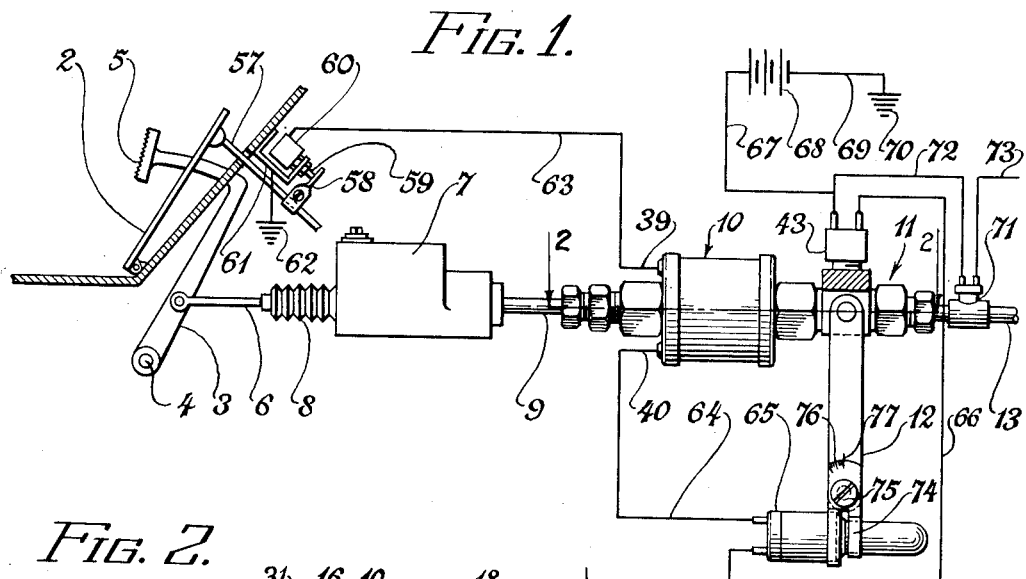
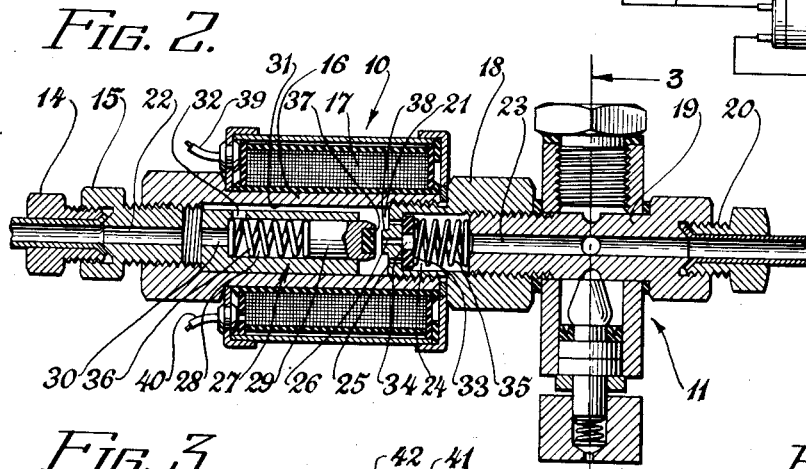
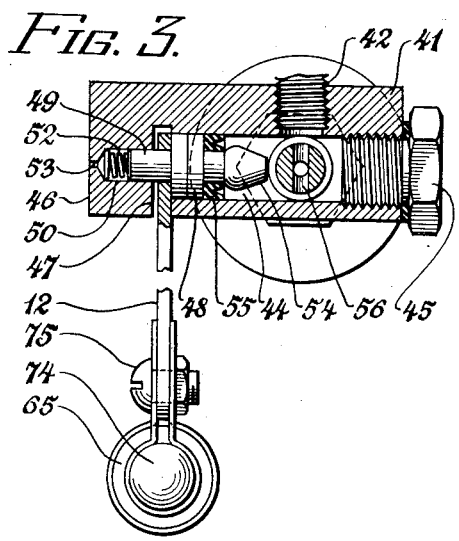
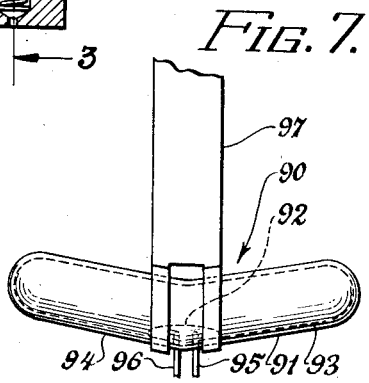
Inventors:
James K. Gaylord
Raymond J. Carter
Paul T. Hahn
By: Gary, Desmond & Parker
Attys.

Sept. 11, 1956  J. K. GAYLORD ET AL  2,762,476
AUTOMOTIVE ANTI-CREEP DEVICE WITH PENDULUM SWITCH MEANS
Filed June 14, 1952  2 Sheets-Sheet 2
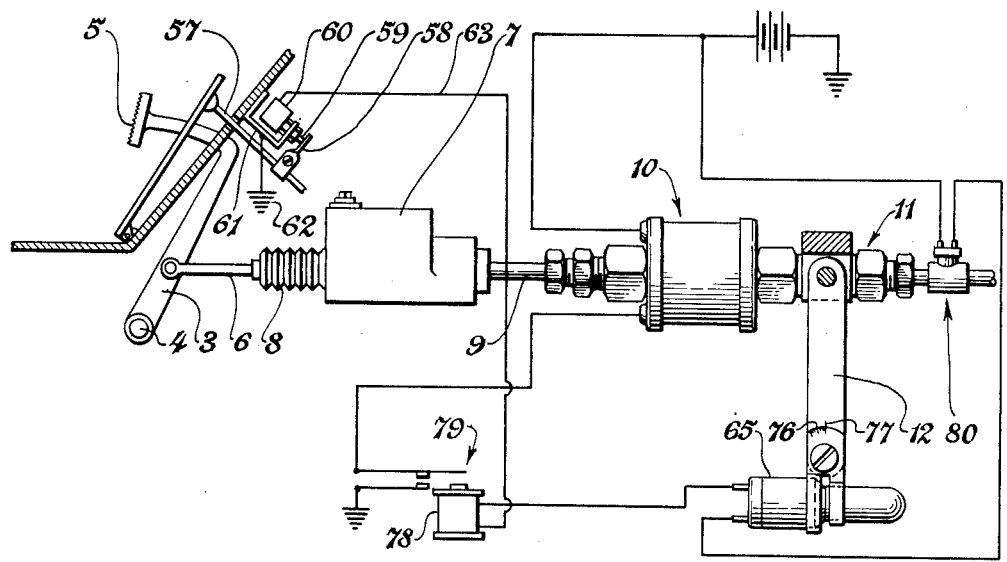
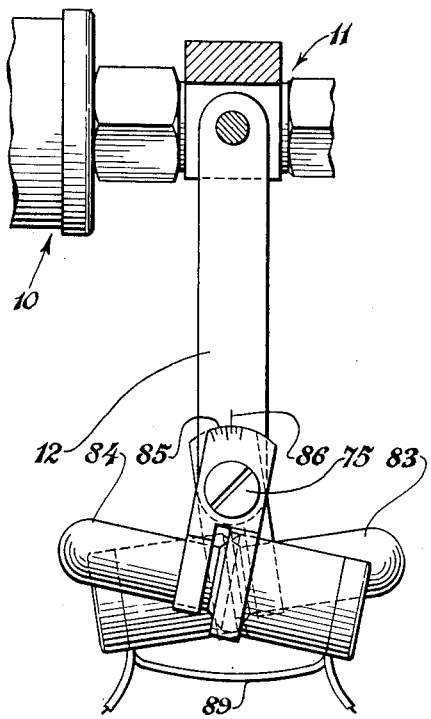
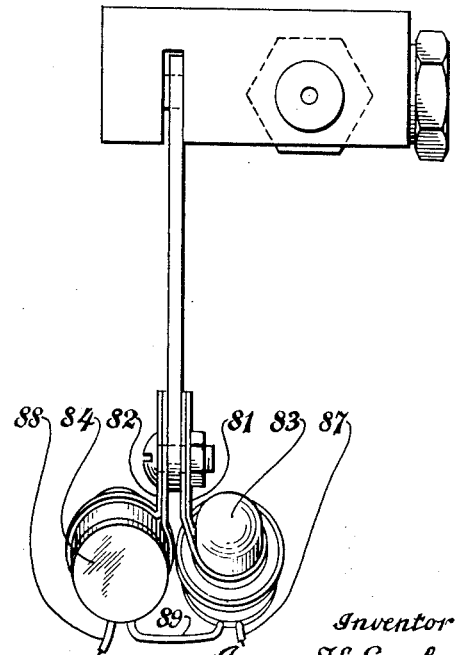
Inventors:
James K. Gaylord
Raymond J. Carter
Paul T. Hahn
By: Gary, Desmond & Parker
Attys.

United States Patent Office 2,762,476
Patented Sept. 11, 1956

2,762,476

AUTOMOTIVE ANTI-CREEP DEVICE WITH PENDULUM SWITCH MEANS

James K. Gaylord, Raymond J. Carter, and Paul T. Hahn, Chicago, Ill., assignors to Gaylord Products, Incorporated, Chicago, Ill., a corporation of Delaware Application June 14, 1952, Serial No. 293,708

10 Claims. (Cl. 192—3)

This invention relates to improvements in an anti-creep device for automotive vehicles and refers particularly to a device for preventing undesired movement of a vehicle whether the vehicle rests upon a horizontal surface, or a surface which is inclined upwardly or downwardly relative to the length of the vehicle.

In automotive vehicles having conventional friction clutches and manually shiftable gear transmissions, difficulty has heretofore been encountered in preventing undesired movement of the vehicle on slopes when the clutch is disengaged unless the operator maintains the service brakes applied or sets the emergency brake. In automotive vehicles having fluid drive and automatic transmission this difficulty is also experienced with the added disadvantage that the vehicle tends to move slowly or creep even when the vehicle rests upon a level surface.

Devices have heretofore been proposed for automatically maintaining an applied brake in braking relationship when the automotive vehicle has stopped, but such devices are effective substantially only on level surfaces or on upgrade surfaces. In view of the fact that in most instances such devices are dependent upon inertia or gravity, where grades are encountered, they are effective only on grades sloped in one direction not in both directions.

One of the important features of the present invention resides in the provision of means in an automotive vehicle having a fluid brake system whereby the movement-preventing mechanism is effective to prevent undesired movement of the vehicle on level surfaces or surfaces graded in either direction.

Briefly described the present invention comprises an electrically operated control valve interposed in the hydraulic brake line of a vehicle, the valve being associated with a series of electrical switches comprising an inertia-operated switch carried by a gravity-operated pendulum, the pendulum being so controlled as to move freely under the influence of gravity until braking pressure is applied to the hydraulic system at which time the pendulum is locked in the position it occupied at the moment that braking pressure is applied. By this arrangement the pendulum will, under the influence of gravity, occupy a fixed position with respect to the gravitational pull, whether the vehicle is moving upgrade or downgrade until braking pressure is applied whereby the pendulum is locked in said fixed position permitting inertia to operate upon the switch carried by the pendulum in a manner uninfluenced by a variable gravity factor.

Other features and advantages of the present invention will be apparent from the accompanying drawings and following detailed description.

In the drawings:

Fig. 1 is a diagrammatic view of one arrangement of the parts of an anti-creep device.

Fig. 2 is a sectional view of a solenoid operated valve which may be employed with the anti-creep device, illustrating the pendulum locking mechanism, the sectional view being taken on line 2—2 of Fig. 1.

Fig. 3 is a sectional view of the pendulum locking mechanism, taken on line 3—3 of Fig. 2.

Fig. 4 is a diagrammatic view of a modified anti-creep system.

Fig. 5 is a detailed view of a locking pendulum carrying two inertia switches.

Fig. 6 is an end view of the device shown in Fig. 5.

Fig. 7 is a fragmentary detailed view of a modified form of inertia switch carried by the lockable pendulum.

Referring in detail to the drawings, 1 indicates the floorboard of an automotive vehicle upon which a conventional accelerator pedal 2 is hingedly mounted. A service brake arm 3 is pivoted to the frame of the vehicle, as at 4 in Fig. 1, said arm protruding through the floorboard 2 and carrying the usual pedal portion 5 at its end.

A rod 6 is pivotally connected to the brake arm 3 and extends at its opposite end into a master pressure cylinder 7 for the hydraulic braking system of the vehicle. An accordion type seal or packing gland prevents leakage of brake fluid from the cylinder 7 along rod 6. A tubular pipe 9 connects into cylinder 7 and functions to convey the fluid under pressure from the cylinder to the other component parts of the fluid braking system.

Pipe 9 connects into solenoid operated valve 10 which will be more fully described hereinafter. The valve 10 comprises essentially a normally open valve which may be closed by the energization of an electric solenoid associated with the valve.

Connected to the opposite end or outlet end of the solenoid valve 10 is a pendulum mechanism 11 which, as will be hereinafter more fully described, comprises a locking mechanism for pendulum member 12 when fluid under pressure passes through valve 10 from the master cylinder 7. A pipe 13 connects the pendulum mechanism 11 to the various wheel brake cylinders (not shown) of the usual fluid braking system, or if desired, pipe 13 may connect with a fluid brake cylinder which may be associated with the propeller shaft of the automotive vehicle.

The solenoid operated valve 10 is connected to pipe 9 at one end thereof by means of bushings 14 and 15. Bushing 14 is externally threaded and functions to anchor the flared end of pipe 9 in the head of bushing 15 which, in turn, is externally threaded and connects into the head of a non-ferrous sleeve 16 upon which a solenoid coil 17 is mounted.

At the opposite end of the sleeve 16 a bushing 18 threadedly engages with the sleeve, the bushing 18, in turn, being threadedly engaged with a threaded member 19 which comprises a portion of the pendulum lock mechanism 11. The sleeve 16 is provided with a central bore 21 and bushing 15 and member 19 are provided with bores 22 and 23 respectively. The bushing 18 is of hollow construction having a recess 24 provided therein into which one end of the bore 23 connects. The end of the bushing 18 is provided with a plurality of circumferentially disposed relatively restricted bores 25 which connect the recess 24 in bushing 18 with the recess 21 in sleeve 16. The end of bushing 18 is also provided with a central relatively restricted bore 26 which also connects recess 24 and recess 21.

Within the recess 21 of sleeve 16 a slidable core 27 is positioned, said core being constructed of a ferrous metal and being adapted for limited axial movement within the recess 21. The core 27 is of hollow construction having a central relatively enlarged recess 28 in which a plug 29 is slidably positioned. The core 27 is also provided with a bore 30 which connects bore 22 in bushing 15 with recess 28 in the core. The core 27 is also provided with a longitudinal groove or slot 31 which extends throughout the entire length of the core. A transverse bore 32 connects the interior of recess 28 with slot 31.

Within the recess 24 provided in bushing 18 a substantially circular disc 33 is positioned adjacent the inner end of the bushing, said disc being provided with a central aperture 34. A coil spring 35 bears at one end against the end of member 19 and at its opposite end said spring bears against disc 33 functioning to close the restricted bores 25 when said disc is positioned in contact with the inner surface of the end of bushing 18. However, as will be hereinafter more fully described, depending upon the relative pressures in the recess 21 and recess 24, the disc 33 may be unseated to permit communication through bores 25 between recesses 21 and 24. By the provision of the central aperture 34, the bore 26 and recess 24 are always in communication, except as hereinafter described.

A coil spring 36 is positioned in the recess 28 provided in core 27, said spring tending to urge plug 29 outwardly with respect to the recess 28. The end of the plug 29 carries a resilient disc 37 which, under predetermined circumstances, seats upon a projection 38 carried at the outer end of bushing 18, the projection being provided with a bore which is vertically a continuation of bore 26.

Under driving conditions, that is, when the brakes are not applied, the core 27 is in the position shown in Fig. 2, that is, communication exists between recess 21 and recess 24 and hence the braking cylinders are relieved of fluid pressure. Electrical conductors 39 and 40 connect into the solenoid coil 17 and when current is passed through said conductors, core 27, being constructed of ferro-magnetic material moves so as to seat disc 37 upon the projection 38 thereby closing communication between recesses 21 and 24 through bore 26. Of course, if braking pressure is established in the master cylinder 7, such pressure will cause disc 33 to become unseated and fluid under pressure will pass through bores 25 to recess 24 and from thence to the braking cylinders. However, when the fluid pressure in recess 24 is equal to or exceeds the pressure in recess 21, the disc 33 will be seated and if, at the same time, the solenoid 17 is energized, all communication between the recesses 21 and 24 will be prevented unless the pressure within recess 24 is greatly excessive in which case spring 36 will be compressed by the unseating of disc 37. Hence, the strength of spring 36 will determine the maximum pressure which can be maintained within the wheel brake cylinders by the disc 37.

A pendulum lock housing 41 is mounted upon the member 19, said housing being of hollow construction and having an upwardly extending threaded bore 42 into which a pressure operated switch 43 is threadedly positioned. The pressure operated switch is of conventional construction and is of the normally open type which may be closed when the diaphragm element (not shown) of the switch is subjected to a predetermined pressure.

The housing 41 is also provided with a laterally extending bore 44 which may be closed at one end by a plug 45. A portion of the housing 41 overhangs the opposite end of the bore opening, as at 46, in Fig. 3, providing a space 47 between the overhang 46 and the end of the bore. A movable piston 48 is positioned within bore 44 and carries an outwardly extending piston rod 49 which is received within a guide aperture 50 provided in the overhang 46. A pendulum bar 12 is freely swingable upon rod 49 and is positioned in the space 47, the space being of sufficient width normally to permit free swingability of the bar.

A coil spring 52 is positioned within the guide aperture 49 and bears upon the end of rod 49 to urge said rod inwardly of bore 44. A vent hole 53 is provided at the end of the aperture to relieve air pressure therein occasioned by inward movement of the rod in said aperture.

A projecting portion 54 of rod 49 bears upon the member 19 within the cylinder and functions to prevent excessive inward movement of the piston. To prevent leakage past piston 48 within bore 44, a resilient gasket 55 is carried upon the inner projecting portion 54 adjacent the inner face of said piston.

The member 19 is provided with a transverse bore 56 which effects communication between bore 23 and the interior of housing 41. The arrangement is such that when no pressure is applied to the wheel brake cylinders, the parts are in the position illustrated in Fig. 3 and the bar 12 is free to swing upon the rod 49. However, when fluid pressure is established in the bore 23, that is, when the brakes of the vehicle are applied, pressure is established in the housing 41 and switch 43 is closed and piston 48 moves outwardly into pressure contact with bar 12. The bar 51 is thus frictionally locked against the opposed face of the overhang 46 and further swingable movement of the bar is prevented. The function of the lockable pendulum bar 12 and pressure operated switch 43 will be hereinafter more fully described.

Referring particularly to Fig. 1, a rod 57 connects the accelerator pedal 2 to the throttle of the vehicle (not shown). A lug 58 is mounted upon the rod 57 and is adapted to make contact with plunger 59 of a conventional electric switch 60, said switch being mounted upon a bracket 61 which in turn is carried by floor board 1. The switch 60 may be of the "micro switch" type and preferably is of the normally open type, the switch being closed by lug 58 when the operator releases pressure upon the accelerator pedal 2. Conversely when the accelerator pedal 2 is depressed, switch 60 is opened.

One side of the switch 60 is grounded as indicated at 62 in Fig. 1. The opposite side of the switch is connected by means of conductor 63 to the conductor 39 comprising one terminal of the solenoid 17. The opposite terminal 40 of solenoid 17 is connected by means of conductor 64 to one side of a mercury switch 65, the opposite side of which is connected by conductor 66 to one side of the pressure operated switch 43. The opposite side of the pressure operated switch 43 is connected by means of conductor 67 to battery 68, which may comprise the storage battery carried by the vehicle. The opposite side of battery 68 is connected by means of conductor 69 to ground 70.

A pressure operated switch 71 is interposed in the brake line 13, one side of said switch being connected by means of conductor 72 to conductor 67 and the opposite side of said switch being connected by means of conductor 73 to a conventional stop light (not shown).

The mercury switch 65 is carried by a strap 74 which encircles the tubular portion of the mercury switch, the end portions of the strap being secured by means of bolt 75 to the lower end portion of the pendulum bar 12. An end portion 76 of strap 74 is provided with calibrations which are adapted to cooperate with an index 77 carried by the pendulum bar 12, the arrangement being such that by loosening the bolt 75 the mercury switch 65 may be disposed at a desired angular position with respect to the pendulum bar 12. Preferably, the mercury switch 65 is inclined at a relatively slight angle to the horizontal, when the pendulum bar 12 is disposed vertically, the tubular portion of the switch being inclined upwardly with respect to the forward direction of motion of the automotive vehicle.

In describing the operation of the present invention, it is believed that the invention will be clear by assuming various stated driving conditions which are normally met with in the operation of an automotive vehicle. Assuming the vehicle is moving at a uniform velocity, the accelerator pedal 2 will be depressed a predetermined degree. As a consequence switch 60 will assume its normal open condition and the circuit to the solenoid 10 will be open. Accordingly, the core 27 of the solenoid will be in its retracted position, that is, the position shown in Fig. 2 of the drawings and communication between the master cylinder 7 and the wheel brake cylinders will be established through the apertures 26 and 34. During this phase of the driving operation the brakes, of course, will not be applied.

In view of the fact that constant velocity of the vehicle is assumed, and no braking pressure is established in the brake lines, the pendulum bar 12 will be free to swing about the rod 49 and with the vehicle moving at a uniform velocity, said pendulum bar will be disposed vertically. The vertical disposition of the pendulum bar 12 in the circumstances stated will be substantially independent of the nature of the surface over which the vehicle is traveling, that is, whether the surface is level, or inclined upwardly or downwardly. Consequently, it can readily be seen that the present invention will have no effect whatsoever upon the operation of the vehicle during normal driving conditions when the vehicle is moving at a uniform velocity. If, during the period that the vehicle is moving at a uniform speed, the pressure on the accelerator is removed, the switch 60 will be closed. The release of the pressure upon the accelerator, however, causes the vehicle to decelerate and hence the pendulum bar may move forwardly by virtue of its inertia. During the decelerating period, if both the pendulum and mercury move forwardly together the circuit to the solenoid may be closed. However, under the conditions stated, it makes little or no difference whether the circuit to the solenoid 10 is open or closed since no braking pressure has been established by manipulation of the brake pedal 5. Hence, under this condition of operation, that is, where the vehicle is essentially coasting with no braking pressure being applied, the present invention plays no part in the operation of the vehicle nor does it interfere with the normal operation of the vehicle.

Assume, however, that while the vehicle is moving at a constant velocity, it is desired to decelerate the vehicle by applying the brake but yet not to stop the vehicle. In these circumstances the operator will undoubtedly remove pressure from the accelerator pedal, closing switch 60 and will apply pressure to brake pedal 5, establishing braking pressure in the master cylinder 7. Since braking pressure has been established, and the vehicle decelerates, the fluid pressure established within the housing 41 will displace piston 48 outwardly and thereby lock the pendulum bar 12 against the opposed face of the overhang 46. The pendulum bar will thus be maintained motionless but due to the deceleration of the vehicle the mercury in switch 65 will have moved forwardly and thus the circuit through switch 65 will be broken. Hence, the solenoid 10 will not be energized and when pressure is relieved from the brake pedal 5, pressure will be relieved from the wheel brake cylinders. Consequently, it can readily be seen that during this condition of operation of the vehicle, the invention plays no part and likewise does not interfere with the normal operation of the vehicle.

Assuming, now, that it is desired to stop the vehicle, the operator's foot will be removed from the accelerator pedal and will be applied to the brake pedal. Hence, switch 60 will be closed and pressure will be established in the brake lines. During the decelerating period, the mercury in the switch 65 will remain in its forward position and said switch will be open. However, as the vehicle comes to a stop the inertia of the mercury globule within the switch 65 will be lost and said globule will move backwardly in the mercury switch and thus close said switch. Simultaneously, in view of the fact that pressure is established in the brake pressure lines, the switch 43 will be closed and hence the solenoid 10 will be energized with fluid under pressure in the wheel brake cylinders. In this fashion when the vehicle comes to a stop, with the application of braking pressure the solenoid 10 will maintain braking pressure in the wheel brake cylinders since switches 60, 65 and 43 will all be closed. It will be noted that the stop light switch circuit is not dependent upon the closing of either the switches 60 or 65 and is dependent upon the closing of switch 71 which in turn is only dependent upon the establishment, whether temporary or permanent, of braking pressure in the line 13. Consequently, when the vehicle is merely retarded by the application of the brakes, the stop light will be illuminated yet the solenoid 10 will not be energized but when the vehicle is stopped by the application of the brakes, the stop light will be illuminated and the solenoid 10 will be energized whereby braking pressure will be established upon the wheel brake cylinders which will prevent undesired movement of the vehicle.

One of the important features of the present invention resides in the provision of the pendulum support for the mercury switch 65. As has been hereinbefore described, said switch is normally inclined at an angle to the horizontal when the pendulum bar 12 is disposed vertically. The less that this angle of inclination can be made the more sensitive will be the operation of the mercury switch. However, if the switch is to approach the horizontal too closely, the operation will be too critical.

This suggests the difficulty which the present invention is intended to cure, that is, the conditions which a device of this character are confronted with when the vehicle rests upon an upward or downward inclination when it is desired to prevent unintended movement of the vehicle. It can be seen that if the vehicle is moving along an upwardly inclined surface, the pendulum bar 12 will move rearwardly until it assumes a truly vertical line. If the brakes are applied and the vehicle is stopped, the pendulum bar will be immediately locked in this rearward vertical position and consequently the mercury globule will move rearwardly in the mercury switch in the same fashion as when the vehicle was disposed upon a horizontal surface.

If the vehicle is moving along a downwardly inclined surface, the pendulum bar 12 will swing forwardly until it occupies a directly vertical position. If the brakes are applied, and the vehicle brought to a stop, the application of the brakes immediately locks the pendulum bar in its forwardly inclined position and hence the movement of the mercury globule is the same as has been hereinbefore described in conjunction with level operation or operation on an upwardly inclined surface.

Accordingly, by the provision of the lockable pendulum bar 12 as a support for the mercury switch 65 the effect of gravity as a variable factor in the operation of the mercury switch is eliminated, that is, the mercury will move in the switch 65 in the same fashion whether the vehicle is on a level surface, an upwardly inclined surface or a downwardly inclined surface, the only controlling factor being the setting of the mercury switch with regard to the pendulum bar as indicated by the calibrations 76.

Referring particularly to Fig. 4, a slight modification of the wiring diagram is shown. The arrangement shown in Fig. 4 is essentially the same as that shown in Fig. 1 hereinebefore described insofar as its ultimate function is concerned and most of the parts are identical. Without duplication of description the identical parts in each figure will be given the same reference numerals and only those added or substituted parts will be described in detail.

It will be noted that in the form of the invention shown in Fig. 1, switches 43, 60 and 65 carry the full current load of the solenoid 10 and, hence, such switches must be of a capacity to withstand such load. In the arrangement shown in Fig. 4, switches 60 and 65 carry only the load of solenoid 78 of relay 79 and the relay switch carries the solenoid load current. This also permits the use of a stop light switch 80 of conventional type in place of switch 43, which latter is of the same general type but of heavier capacity. It can readily be seen that the solenoid circuit is completed through relay switch 79 when the relay solenoid 78 is energized through switches 60, 65 and 80 in the same fashion that solenoid 10, in Fig. 1, is energized through switches 60, 65 and 43. A stop light switch similar to switch 71 and used for the same purpose may be incorporated in the arrangement shown in Fig. 4, if desired.

It is desirable, in operating an automotive vehicle in reverse, that during reverse travel of the vehicle, the vehicle be slowed down by the use of the service brakes without bringing the anti-creep mechanism, hereinbefore described, into operation. To accomplish this two mercury switches connected in series, as shown best in Figs. 5 and 6, or a double mercury switch, as shown in Fig. 7, may be employed.

Referring particularly to Figs. 5 and 6, the pendulum bar 12 associated with the pendulum locking mechanism 11, as hereinbefore described, carries at its end a pair of straps 81 and 82, each of which supports a mercury switch 83 and 84, respectively. The switches 83 and 84 are identical in construction and are each identical with mercury switch 65. Each of the straps 81 and 82 are provided with calibrations 85, only one set of which are shown, which cooperate with indices 86 carried by the pendulum bar 12. The straps 81 and 82 are secured to the bar 12 by a bolt 75.

Similar to mercury switch 65, the switches 83 and 84 are each provided with a pair of switch points or electrodes which are bridged by a globule of mercury when the switch is canted at a predetermined angle in a predetermined direction. The switches 83 and 84 may be connected in a circuit arrangement such as shown in either Fig. 1 or Fig. 4, as desired, and if connected as in Fig. 1, lead 87 may be connected to conductor 66 and lead 88 may be connected to conductor 64, or if connected as in Fig. 4, lead 87 may be connected to one side of switch 80 and lead 88 may be connected to one side of the solenoid coil 78. In each case a jumper 89 conects one terminal of switch 83 to one terminal of switch 84, that is, the switches 83 and 84 are connected in series.

In positioning switches 83 and 84 upon pendulum bar 12, said switches are canted to a small degree such that their longitudinal axes are inclined to the horizontal when the bar 12 is vertical and each switch is canted in the opposite direction. In this position both switches are closed and the circuit is completed from lead 87 to lead 88. When the vehicle is moving forwardly uniformly or is at rest switch 84 will be closed and will also be closed during forward deceleration. Consequently, switch 83, when the vehicle is at rest, moving uniformly or is decelerating functions identically with switch 65. The only time that switch 84 is open during forward movement of the vehicle is when the vehicle accelerates and at that period switch 83 is functionless, as is switch 65. Hence, the incorporation of switch 84 in the system has no effect upon the intended function of switch 83 which acts in all respects as switch 65, hereinbefore described.

Likewise switch 83 is always closed during the period of rest of the vehicle, during uniform velocity of the vehicle forwardly or backwardly, and during rearward deceleration. During rearward movement of the vehicle, the only time that switch 83 is open is during rearward acceleration of the vehicle at which time switch 84 is not intended to act.

During rearward deceleration of the vehicle, that is where the vehicle is slowed down by braking during rearward movement, switch 84 opens and, hence, the solenoid 10 is rendered inoperative and the anti-creep function of the invention is not brought into play. However, at the termination of rearward movement, that is when the vehicle is braked to a stop, both switches 83 and 84 are closed and inasmuch as switch 60 and either switches 43 or 80 are closed, the solenoid is energized and the brakes are set by the confined fluid under pressure in the wheel brake cylinders. Accordingly, similar to the operation hereinbefore described with respect to forward movement of the vehicle, creeping or unintended movement of the vehicle is prevented.

In all respects, switch 84 operates with respect to rearward movement of the vehicle as switch 65 functions on forward movement of the vehicle. The operation of the pendulum locking mechanism is also the same with rearward movement as has been hereinbefore described with respect to forward movement.

Referring particularly to Fig. 7, a mercury switch 90 is shown which may be employed in place of switches 83 and 84, hereinbefore described. The switch 90 which in itself comprises the subject of our copending patent application Serial No. 293,707, filed June 14, 1952 comprises a tubular member 91 which is closed at its opposite end and carries a globule of mercury 92. The tube is formed in two sections 93 and 94 joined together with their respective axes at an angle to each other. A pair of terminals 95 and 96 terminate in a pair of electrodes within the tube adjacent the juncture of the two tube sections, the electrodes being normally bridged by the mercury globule 92. The mercury switch 90 may be carried by a pendulum bar 97 which may be suspended at its upper end in the same manner as described in conjunction with the bar 12.

In the operation of the switch 90, it functions, in so far as its anti-creep function is concerned the same as both switches 83 and 84. Assuming that the forward motion of the vehicle is from left to right, as viewed in Fig. 7, forward acceleration of the vehicle causes the globule to move into section 93 and thus switch 90 is open. Of course, the accelerator operated switch 60 and the switch 43 or 80 will also be open at this phase of the operation and, hence, switch 90 is functionless in these circumstances. Upon retarding the forward movement by braking, the globule 92 will move into section 93 and, hence, during retardation the switch 90 is open. At this time accelerator operated switch 60 is closed and switch 43 or 80 will also be closed and, hence, switch 90 performs the useful function of keeping the solenoid circuit open during deceleration. When, however, the vehicle is braked to a stop, switches 60 and 43 or 80 will be closed and the mercury globule 92 will have moved to its bridging relationship to the electrodes carried therein and, hence, the solenoid 10 will be energized to confine braking fluid under pressure in the wheel brake cylinders and creeping or other undesirable movement of the vehicle will be prevented.

Of course, on reverse movement of the vehicle the switch 90 will function the same, that is, it will only be functionally closed when the vehicle is braked to a stop after previous reverse movement.

The pendulum bar 97 being associated with the pendulum lock mechanism 11 in the same fashion as pendulum bar 12, the switch 90, as well as the switches 83 and 84 will respond on slopes in the same manner as does the switch 65.

Of course, switch 90, as well as switches 83 and 84 may be connected in circuits such as shown in either Fig. 1 or Fig. 4.

It will be noted that by the provision of the projecting end portion 54 of piston rod 49, piston 48 will be disposed closely adjacent bar 12 when no fluid pressure is established in zone 44. The piston at this phase of the operation will not interfere with the free swinging of the pendulum bar. It is desirable that this close normal relationship of piston 48 and bar 12 obtain because with a small stroke of piston 48 excessive brake pedal displacement will not be necessary.

We claim as our invention:

1. A device for preventing undesired motion of an automotive vehicle having a fluid actuated braking system of the type having a brake line with a pressure establishing side and a pressure braking side, comprising a normally open solenoid-operated valve connected in said brake line between the said two sides of the system, said valve being closed when said solenoid is energized, a pendulum lock mechanism mounted in said brake line on the pressure braking side of said valve, said mechanism comprising a freely swinging pendulum bar normally occupying a substantially plumb position and means for locking said bar in said substantially plumb position when pressure is established in the pressure braking side of said brake line to decelerate the vehicle, a normally closed inertia-operated switch carried by said pendulum bar which is opened during substantial deceleration of the vehicle, and an electric circuit including a source of current, said solenoid and said inertia-operated switch, whereby said valve is maintained open when the vehicle is substantially decelerated and closed when the vehicle is stopped.

2. A device for preventing undesired motion of an automotive vehicle having a fluid actuated braking system of the type having a brake line with a pressure establishing side and a pressure braking side, comprising a normally open solenoid-operated valve connected in said brake line between the said two sides of the system, said valve being closed when said solenoid is energized, a pendulum lock mechanism positioned in said brake line on the pressure braking side of said valve, said mechanism comprising a gravity-operated freely swinging pendulum bar normally occupying a substantially plumb position and means for locking said bar in said substantially plumb position when pressure is established in the pressure braking side of said brake line to decelerate said vehicle, a normally closed inertia-operated switch carried by said pendulum bar which is opened during substantial deceleration of the vehicle relative to its movement in a forward direction, and an electric circuit including a source of current, said solenoid and said inertia-operated switch, whereby said valve is maintained opened when the vehicle is decelerated and closed when the vehicle is substantially stopped.

3. A device for preventing undesired motion of an automotive vehicle having a fluid actuated braking system of the type having a brake line with a pressure establishing side and a pressure braking side, comprising a normally open valve connected in said brake line between the two sides of the system, a solenoid for closing said valve when the solenoid is energized, a pendulum lock mechanism positioned in said brake line on the pressure braking side of said valve, said mechanism comprising a gravity-operated freely swinging pendulum bar and means for locking said bar when pressure is established in the pressure braking side of said brake line and before the brakes are applied, a normally closed inertia-operated switch carried by said bar which is opened during substantial deceleration of the vehicle, and an electric circuit including a source of current, said solenoid and said inertia-operated switch, whereby said valve is maintained opened when the vehicle is decelerated and closed when the vehicle is substantially stopped.

4. A device for preventing undesired motion of an automotive vehicle having a fluid actuated braking system of the type having a brake line with a pressure establishing side and a pressure braking side, comprising a normally open valve connected in said brake line between the said two sides of the system, a solenoid for closing said valve when the solenoid is energized, a pendulum lock mechanism positioned in said brake line on the pressure braking side of said solenoid, said mechanism comprising a gravity-operated freely swinging pendulum bar and means for locking said bar when pressure is established in the pressure braking side of said brake line and before the brakes substantially decelerate the vehicle, a normally closed inertia-operated switch which is opened during substantial deceleration of the vehicle, relative to its movement in a forward direction, and an electric circuit including a source of current, said solenoid and said inertia-operated switch, whereby said valve is maintained opened when the vehicle is decelerated and closed when the vehicle is substantially at rest.

5. A device for preventing undesired motion of an automotive vehicle having a fluid actuated braking system of the type having a brake line with a pressure establishing side and a pressure braking side, comprising a normally open valve connected in said brake line between the said two sides of the system, a solenoid for closing said valve when the solenoid is energized, an electric circuit including a source of electric current and including said solenoid, a mercury inertia switch connected in said circuit and carried by said vehicle, said switch being closed when the vehicle is substantially at rest and being opened by inertia when the vehicle is substantially decelerated, whereby said solenoid is deenergized when the vehicle is substantially decelerated and energized when the vehicle is substantially at rest, gravity operated means carried by said brake line for maintaining said switch in a substantially predetermined position relative to gravity during substantially uniform motion of the vehicle and when the vehicle is at rest, and means operable by pressure from said brake line for locking said gravity operated means in said predetermined position when the vehicle is decelerated by the application of the brakes.

6. A brake control device for an automotive vehicle having fluid operated brakes wherein a solenoid operated valve functions to confine fluid under pressure in the brake cylinder when the solenoid is energized, said brake control device comprising a freely swinging plumb bar, a bar locking mechanism for supporting said bar positioned in the brake line of the brake system and subject to brake pressure therein, an inertia operated switch carried by said plumb bar for controlling current to said solenoid, said switch being normally closed when said vehicle is at substantial rest and being opened by inertia when said vehicle is substantially decelerated, and fluid operated means in said bar locking mechanism for locking said bar substantially in situ as long as fluid pressure is established in the vehicle brake lines.

7. A brake control device for an automotive vehicle having fluid operated brakes wherein a solenoid operated valve functions to confine fluid under pressure in the brake cylinder when the solenoid is energized, said brake control device comprising a freely swinging plumb bar, a bar locking mechanism for supporting said bar positioned in the brake line of the brake system and subject to brake pressure therein, an inertia operated switch carried by said plumb bar for controlling current to said solenoid, said switch being normally closed when said vehicle is at substantial rest and being opened by inertia when said vehicle is substantially decelerated, said bar locking mechanism comprising a piston operated by fluid under pressure from said brake line for locking said bar substantially in situ while fluid pressure is established in the vehicle brake lines.

8. A brake control device for an automotive vehicle having fluid operated brakes wherein a solenoid operated valve functions to confine fluid under pressure in the brake cylinder when the solenoid is energized, said brake control device comprising a freely swinging plumb bar, a bar locking mechanism for supporting said bar positioned in the brake line of the brake system and subject to brake pressure therein, an inertia operated switch carried by said plumb bar for controlling current to said solenoid, said switch being normally closed when said vehicle is at substantial rest and being opened by inertia when said vehicle is substantially decelerated, said bar locking mechanism comprising a piston operated by fluid under pressure from said brake line for locking said bar substantially in situ at the time that fluid pressure is initially established in the vehicle brake lines, said bar locking mechanism comprising means for holding said piston adjacent its bar locking position whereby fluid under pressure acts to urge said piston into bar locking position before the brakes are applied to substantially decelerate the vehicle, and while braking pressure is established in said brake line.

9. A device for preventing undesired motion of an automotive vehicle having a fluid actuated braking system of the type having a brake line with a pressure establishing side and a pressure braking side, comprising a normally open valve connected in said brake line between the said two sides thereof, a solenoid for closing said valve when the solenoid is energized, a normally open pressure-operated switch connected in said brake line, said switch being closed by pressure established in said brake line, a pendulum lock mechanism positioned in said brake line, said mechanism comprising a gravity-operated freely swinging pendulum bar and means for locking said bar when pressure is established in said brake line, a normally closed inertia-operated switch carried by said bar which is opened during deceleration of the vehicle, and an electric circuit including a source of current in which said solenoid, pressure operated switch and inertia operated switch are connected whereby said valve is open when the vehicle is substantially decelerated and closed when the vehicle has been brought substantially to rest by the application of the brakes.

10. A device for preventing undesired motion of an automotive vehicle having a fluid actuated braking system of the type having a brake line with a pressure establishing side and a pressure braking side and an accelerator pedal for controlling the engine throttle, comprising a normally open valve connected in said brake line between the said two sides thereof, a solenoid for closing said valve when the solenoid is energized, a normally open pressure-operated switch connected in said brake line, said switch being closed by pressure established in said brake line, a pendulum lock mechanism positioned in said brake line, said mechanism comprising a gravity-operated freely swinging pendulum bar and means in said brake line for locking said bar when pressure is established in said brake line, a normally closed inertia-operated switch carried by said bar which is open during deceleration of the vehicle, an electric circuit including a source of current in which said solenoid, pressure operated switch and inertia operated switch are connected whereby said valve is open when the vehicle is substantially decelerated and closed when the vehicle has been brought substantially to rest by the application of the brakes, and a normally closed switch carried by said vehicle and connected in said circuit, and means actuated by said accelerator pedal for opening said switch when the pedal is depressed.

References Cited in the file of this patent

UNITED STATES PATENTS

| | | |
|---|---|---|
| Re. 20,733 | Barrett et al. | May 24, 1938 |
| Re. 23,408 | Wiseley | Sept. 4, 1951 |
| 1,519,079 | Whiting | Dec. 9, 1924 |
| 2,262,842 | Goepfrich | Nov. 18, 1941 |
| 2,296,053 | Porter et al. | Sept. 15, 1942 |
| 2,400,278 | Wiseley | May 14, 1946 |

FOREIGN PATENTS

| | | |
|---|---|---|
| 174,859 | Switzerland | Apr. 23, 1934 |